United States Patent
Chen

[11] Patent Number: 5,982,092
[45] Date of Patent: Nov. 9, 1999

[54] LIGHT EMITTING DIODE PLANAR LIGHT SOURCE WITH BLUE LIGHT OR ULTRAVIOLET RAY-EMITTING LUMINESCENT CRYSTAL WITH OPTIONAL UV FILTER

[76] Inventor: Hsing Chen, 5F, No. 83, Jen-Ai St., Hsinchu City, Taiwan

[21] Appl. No.: 08/944,567
[22] Filed: Oct. 6, 1997
[51] Int. Cl.⁶ .................................................. H01J 1/62
[52] U.S. Cl. ....................... 313/512; 313/113; 313/112
[58] Field of Search ................................. 313/512, 113, 313/112

[56] References Cited

U.S. PATENT DOCUMENTS

| | | | |
|---|---|---|---|
| 4,035,686 | 7/1977 | Fleming | 313/512 |
| 4,168,102 | 9/1979 | Chida et al. | 313/512 |
| 4,267,486 | 5/1981 | Thillays | 313/512 |
| 4,853,593 | 8/1989 | Stein | 313/512 |
| 5,045,754 | 9/1991 | Clerc | 313/512 |
| 5,813,752 | 9/1998 | Singer et al. | 313/512 |
| 5,813,753 | 9/1998 | Vriens et al. | 313/512 |

OTHER PUBLICATIONS

Patent Abstract of Japan; Publication No.: 08007614 A; DOP: Jan. 12, 1996 Application No.: 06134763; Date of Filing: Jun. 17, 1994; Applicant: Nichia Chem Ind Ltd.; Inventor: Shimizu Yoshinori; Title: Sheet–Like Light Source (1 pg.).

Primary Examiner—Sandra O'Shea
Assistant Examiner—Ronald E. DelGizzi
Attorney, Agent, or Firm—Dougherty & Troxell

[57] ABSTRACT

LED planar light source which introduces blue light or ultra violet rays emitted from luminescent crystals to a light conductive plate from its side surface. After being scattered and diffused by the light conductive plate and reflected from a reflection layer, the incident light and the excited light from a fluorescent pigment layer are mixed and synthesized to form white light or light of another specific wave length. Such a planar light source can be utilized as a back light source for a LCD.

5 Claims, 3 Drawing Sheets

LIGHT EMITTING DIODE PLANAR LIGHT SOURCE WITH BLUE LIGHT OR ULTRAVIOLET RAY-EMITTING LUMINESCENT CRYSTAL WITH OPTIONAL UV FILTER

BACKGROUND OF THE INVENTION

1. Field of the Invention

The present invention relates to a LED Light Emitting Diode (LED) Planar light source, and more particularly to a LED planar light source which introduces blue light or ultra violet rays emitted from luminescent crystals to a light conductive plate from its side surface. After being scattered and diffused by the light conductive plate and reflected from a reflection layer, the incident light and the excited light from a fluorescent pigment layer are synthesized to form white light or light of other specified wave lengths. Such a planar source can be utilized as a back light source for a Liquid Crystal Display (LCD).

2. Brief Description of the Prior Art

Planar light sources are mainly utilized as back light sources for LCD's. They can be classified according to their configuration as follows:

(1). Miniature tubular cold cathode fluorescent lamp (CCFL) with a diameter of about 2 mm, incorporation a light conductive plate and a reflection layer for diffusing the light. Its lifetime is about 10,000 hours. It is disadvantageous in that a high voltage and frequency are necessary to drive it.

(2). Electro luminescence (EL), is advantageous with a thin structure, but on the contrary, it is disadvantageous since it has to be driven by high voltage and has a short lifetime of about 3,000 hours.

(3). Light emitting diode, (LED) with a long lifetime of more than 50,000 hours and no need of being driven by high voltage, has its advantages, but it is disadvantageous in that a plurality of LED elements must be used to produce sufficient luminous fluxes, as its individual luminous intensity is too small. LED is generally utilized as a small area back light source for black and white LCD.

A Sheet-Like Light Source' was published in the Japanese Patent gazette on Dec. 1, 1996, in which a light emitting diode is used and which can be used as back light and can emit white light by arranging a blue light emitting diode, a diffusing layer and a transparent film having a yellow fluorescent material of yttrium aluminum garnet (YAG) on a transparent light conductive plate.

As shown in FIGS. 1 and 2, there are no basic differences between the construction for the aforementioned white back light plate and other traditional LED planar light sources. The main structure comprises an upper diffusing layer, a light conductive plate as the middle layer, and a reflection layer as the lower layer and a base. It is characterized in that blue light emitting diodes are used as the light source. A layer of yellow fluorescent pigment is applied on the inner surface of the upper diffusing layer, and by means of mixing and synthesizing the blue and yellow lights, the desired white light can be obtained.

However, such arrangement for the components of the planar light source has several disadvantages in that the fluorescent pigment applied on the surface of the planar light source may interfere with the passing of light and it is difficult to control the uniformity of the fluorescent pigment layer, thereby resulting in uneven light color. It is well understood that for a fluorescent pigment itself, it is not a good arrangement to excite a fluorescent layer with incident light from the back and emitting the excited fluorescent light from its front because a low efficiency of light emission will result. Yet at present, construction of all kinds of televisions and fluorescent lamps belong to this category.

SUMMARY OF THE INVENTION

It is a first object of the present invention to provide a LED planar light source with high efficiency and uniform light diffusion. This object is achieved by exciting the fluorescent pigment layer from the front and the excited light also being emitted from the front so that the thickness of the fluorescent pigment layer will not affect the passing of light.

It is a second object of the present invention to provide a LED planar light source with higher efficiency and more uniform light diffusion. This object is achieved by disposing several LEDs around the side surfaces of a light conductive plate, having a plurality of gradually corrugated stripes 12 (see Fig. 1) perpendicular to a light emitting direction or concave grooves provided in the appropriate positions on the bottom surface of the light conductive plate as light scattering points. Further, a reflection layer is provided around the surrounding surface and the bottom surface of the light conductive plate for total reflection. The light conductive plate according to the present invention, such as that described above, does not use a printed mesh configuration on the bottom surface for reflection. This is quite different from the above-described related product.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENTS

Figure 1:
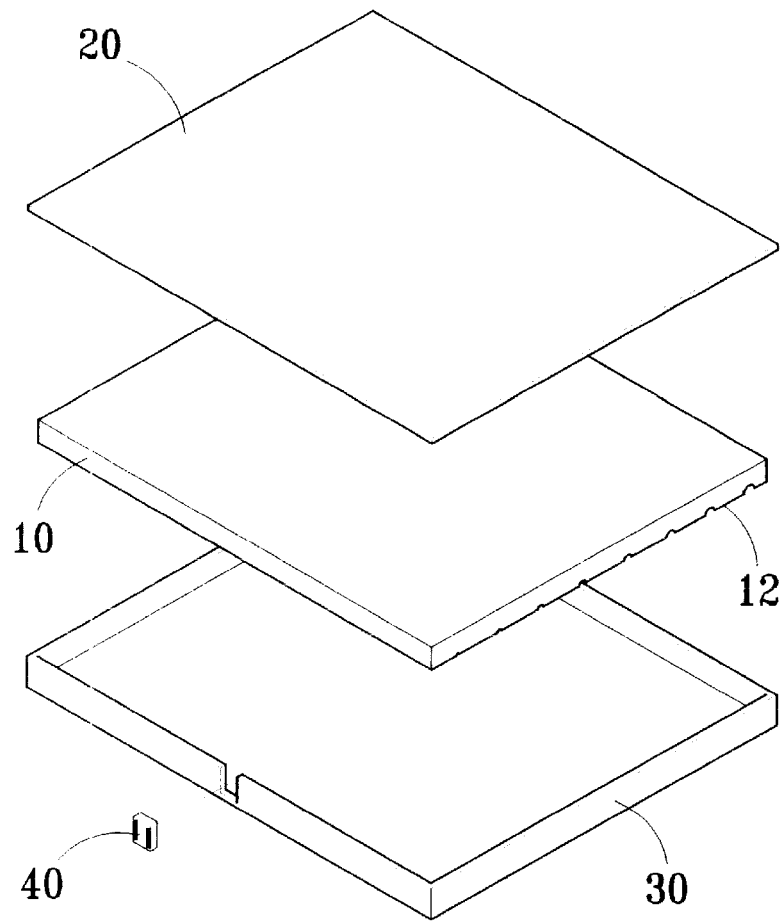
FIG. 1 is a three dimensional exploded drawing of a conventional planar light source.
Figure 2:
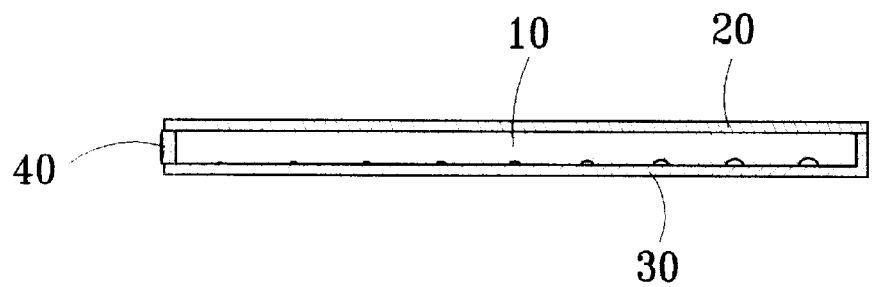
FIG. 2 is a cross sectional drawing of a conventional planar light source.
Figure 3:
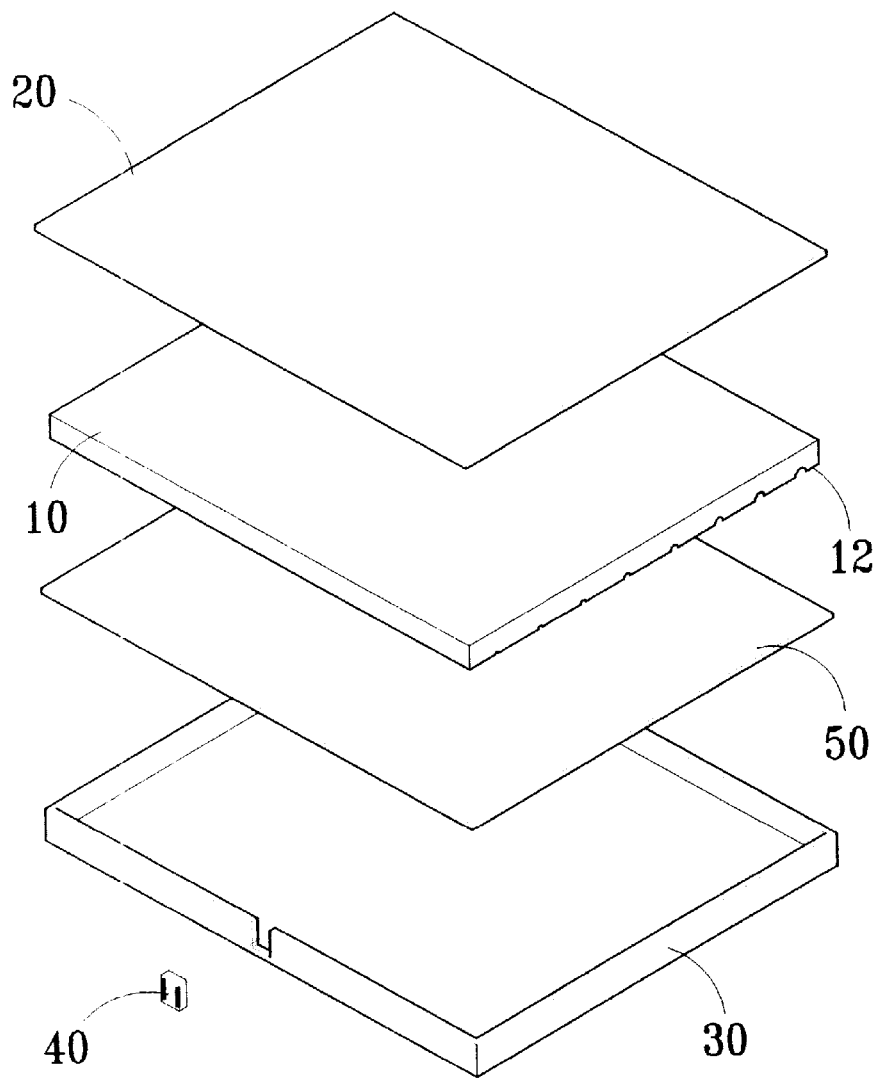
FIG. 3 is an exploded perspective drawing of the LED planar light source according to a first embodiment of the present invention.
Figure 4:
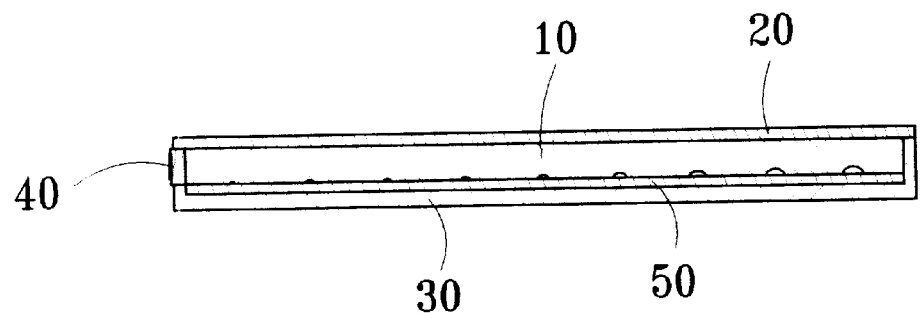
FIG. 4 is a cross sectional drawing of the LED planar light source according to the first embodiment of its present invention.

Referring to FIGS. 3 and 4, which are exploded perspective and cross sectional views of the LED planar light source according to a first embodiment of the present invention, the LED planar light source comprises a diffusing plate 20, a light conductive plate 10, a fluorescent pigment layer 50 able to change the wave length of light, and a reflection layer 30.

The light conductive plate 10 is made of light transmitting material, on whose bottom surface is provided a plurality of corrugated strips 12 for scattering the light entering from the side surface of the light conductive plate and diffusing out from the top surface of the light conductive plate uniformly as a planar light with the aid of a diffusing plate 20. The diffusing plate 20 is overlaid on the light conductive plate 10 for uniformly diffusing the light. The light reflection layer 30 is provided around the surrounding surface and on the bottom surface of the light conductive plate 10 to totally reflect the light reaching the light conductive plate 10. The fluorescent pigment layer 50 is interposed between the light conductive plate 10 and the light reflection layer 30, and is able to convert the wave length of incident exciting light emitted by the luminescent crystal 40. One or more luminescent crystals 40 are placed at one side of the light conductive plate 10 to emit the light to excite the fluorescent pigment layer 50 which converts the wave length of the incident light and emits another light with different wave length.

The components of the present invention are overlapped from top to bottom in the order of the diffusing plate 20, the light conductive plate 10, the fluorescent pigment layer 50, and light reflection layer 30 as shown in FIG. 4. In such construction, blue LEDs can be employed as the luminescent crystals 40 whose emitted light is scattered uniformly by the corrugated strips formed on the bottom surface of the light conductive plate 10 and excites the fluorescent pigment layer 50 containing yellow fluorescent powder for producing yellow light. The yellow light and the blue light are mixed and synthesized to form a white color which is diffused by the uppermost translucent diffusing layer 20 to a uniform, planar white light.

Figure 5:
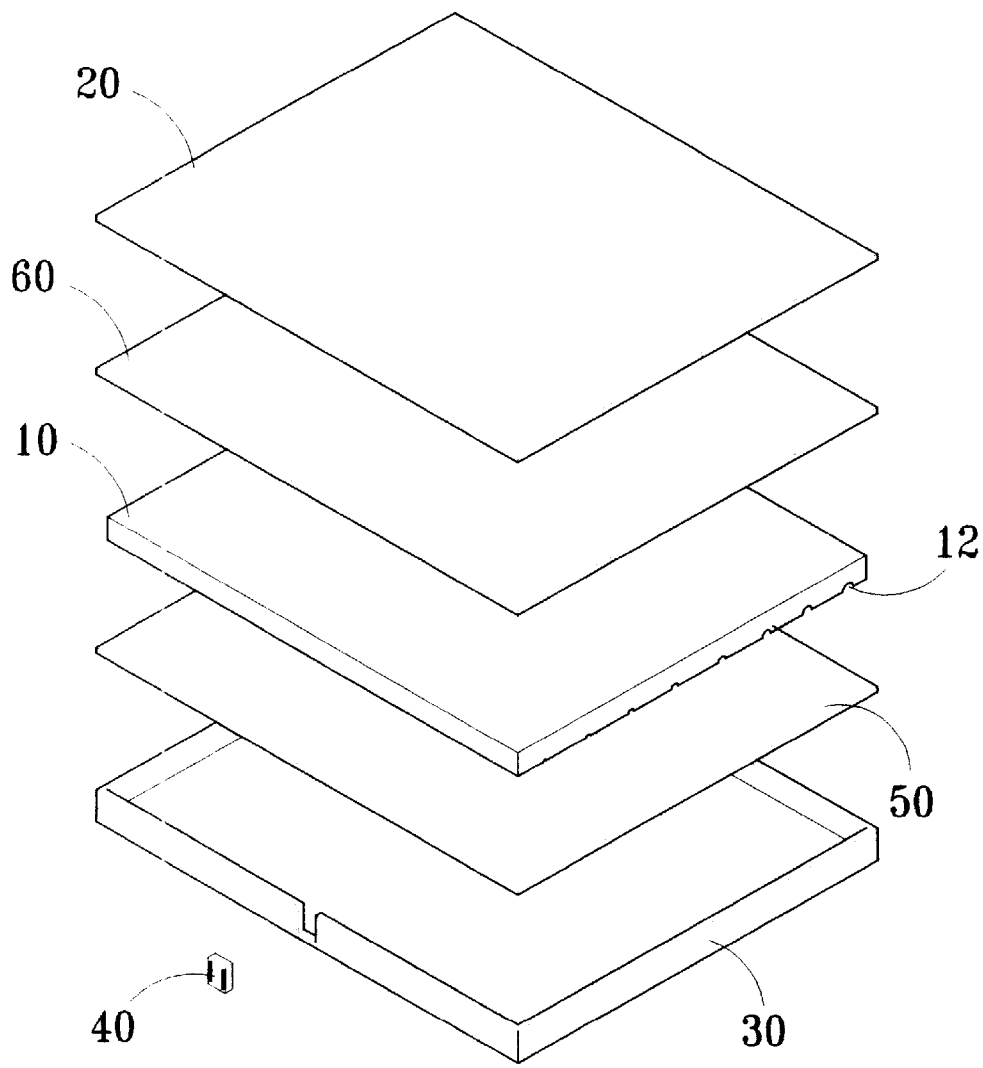
FIG. 5 is an exploded perspective drawing of the LED planar light source according to a second embodiment of the present invention.
Figure 6:
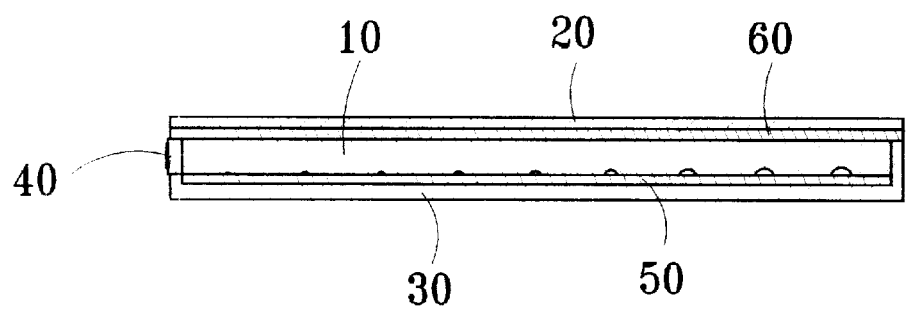
FIG. 6 is a cross sectional drawing of the LED planar light source according to the second embodiment of the present invention.

A second embodiment of the invention is shown in FIGS. 5 and 6, in which the components of the present invention are overlapped from top to bottom in the order of the diffusing plate 20, a filter layer 60, the light conductive plate 10, the fluorescent pigment layer 50, the light reflection layer (base) 30, and the luminescent crystals 40. The light emitted from the light source (the luminescent crystals) enters into the structure through the side surface of the light conductive plate 10 and is scattered from the surface uniformly by the same principal as described in the first embodiment. However the difference of the construction between the first and second embodiments is that, in the second embodiment, the luminescent crystals are used for emitting ultra violet rays instead of the blue LEDs employed in the first embodiment that emit blue light. Accordingly, a filter layer 60 must be applied on the light conductive plate 10 for filtering away the ultra violet rays and allowing the visible light to pass. This is one of the features of the present invention.

In the first embodiment, blue LEDs are used as the light source and yellow fluorescent pigment powder such as Y3A15012, Ce series is used to form the fluorescent pigment layer. While in the second embodiment the luminescent crystals having ultra violet rays (GaN material which can emit ultra violet ray of 360~380 nm), the red, green and blue (R.G.B.) three mixed color fluorescent pigment powder is employed in order to obtain white light of three wave lengths. Individual colored fluorescent pigment powder may be selected for the fluorescent pigment layer. The white light source of three wave lengths may be applied to a back light plate for color LCD. In normal ambient state, the lifetime of the fluorescent pigment layer according to the present invention may last about 50,000 hours without any problems.

The LED planar light source is quite different and superior to prior devices. The important differences are enumerated as follows:

1. The main structural design is different. According to the present invention, the fluorescent pigment layer is formed under the light conductive plate for much better brightness while said layer is formed on the light conductive plate in known devices.

2. According to the present invention, a plurality of corrugated strips are formed on the surface of the light conductive plate by ejection, laser or chemical etching technology for scattering the light. Methods of printing mesh configurations on the light conductive plate, or directly printing fluorescent pigment powder in mesh configurations are utilized by the known devices which must form the fluorescent pigment layer on the light conductive plate.

3. According to the present invention, a blue light luminescent crystal or an ultra violet ray crystal may be employed as the light source. If the latter is employed, a filter layer is added on the surface of the light conductive plate in order to filter away the ultra violet ray. Known devices use only a blue light luminescent crystal for light source, so that no filter layer is formed.

In conclusion, the outstanding features of the LED planar light source according to the present invention are the corrugated strips formed on the bottom surface of the light conductive plate, the fluorescent pigment layer provided beneath the light conductive plate, and the use of a blue light source or ultra violet ray to excite the surface of the fluorescent pigment layer. All of the above means combined to produce synthesized white planar light with sufficient brightness.

Many changes and modifications in the above described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A Light Emitting Diode planar light source comprising:

a) a non-electrode, light conductive plate having first and second opposite facing surfaces and a plurality of side edges, the first surface having a plurality of corrugations therein to scatter light entering from at least one of the plurality of side edges;

b) a diffusing plate located on the second surface of the light conductive plate for uniformly diffusing light emanating from the second surface of the light conductive plate;

c) a non-electrode reflector enclosing the plurality of side edges and the first surface of the light conductive plate;

d) a layer of fluorescent material located between the first surface of the light conductive plate and the reflector; and, e) at least one luminescent crystal located so as to emit light through at least one of the side edges of the light conductive plate, whereby the light is scattered uniformly by the corrugations and light reflected by the reflector excites the layer of fluorescent material.

2. The Light Emitting Diode planar light source of claim 1 wherein the at least one luminescent crystal comprises at least one blue light emitting diode.

3. The Light Emitting Diode planar light source of claim 2 wherein the fluorescent material contains yellow fluorescent powder.

4. The Light Emitting Diode planar light source of claim 1 further comprising a filter layer located between the second surface of the light conductive plate and the diffusing plate.

5. The Light Emitting Diode planar light source of claim 4 wherein the at least one luminescent crystal emits ultra violet rays and the filter layer filters ultra violet rays out of the light passing through the filter layer.

* * * * *